(12) United States Patent
Kidokoro et al.

(10) Patent No.: US 11,165,678 B2
(45) Date of Patent: Nov. 2, 2021

(54) FAILURE MONITORING DEVICE AND FAILURE MONITORING METHOD

(71) Applicant: Nippon Telegraph and Telephone Corporation, Tokyo (JP)

(72) Inventors: Tadaatsu Kidokoro, Tokyo (JP); Koji Tanida, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/045,565

(22) PCT Filed: Apr. 22, 2019

(86) PCT No.: PCT/JP2019/016918
§ 371 (c)(1),
(2) Date: Oct. 6, 2020

(87) PCT Pub. No.: WO2019/208460
PCT Pub. Date: Oct. 31, 2019

(65) Prior Publication Data
US 2021/0029005 A1    Jan. 28, 2021

(30) Foreign Application Priority Data

Apr. 24, 2018  (JP) .............................. JP2018-082758

(51) Int. Cl.
*H04L 12/26* (2006.01)
*H04L 29/12* (2006.01)
(Continued)

(52) U.S. Cl.
CPC ...... *H04L 43/0805* (2013.01); *H04L 61/1511* (2013.01); *H04L 65/1006* (2013.01); *H04L 67/141* (2013.01)

(58) Field of Classification Search
None
See application file for complete search history.

(56) References Cited

U.S. PATENT DOCUMENTS

2006/0045089 A1* 3/2006 Bacher ................ H04L 12/4641
370/392
2008/0056234 A1* 3/2008 Sprague ................ H04L 65/105
370/352
(Continued)

FOREIGN PATENT DOCUMENTS

JP    2013-168862    8/2013

OTHER PUBLICATIONS

[No Author Listed], "3rd Generation Partnership Project; Technical Specification Group Core Network and Terminals; Inter-IMS Network to Network Interface (NNI) (Release 15)," 3GPP A Global Initiative, Dec. 2017, 147 pages.
(Continued)

*Primary Examiner* — Kevin T Bates
*Assistant Examiner* — Emad Siddiqi
(74) *Attorney, Agent, or Firm* — Fish & Richardson P.C.

(57) ABSTRACT

A failure monitoring device and a failure monitoring method that reduce maintenance operations at the time of a failure of an SIP server are provided. A failure monitoring device (10) includes: a monitoring unit (11) configured to transmit a monitoring signal from the outside of an SIP server (2) to the SIP server (2) and detect a failure of the SIP server (2) in accordance with presence/absence of a response from the SIP server (2) or details of a response from the SIP server; and a control unit (12) configured to inhibit, in a case in which the failure has been detected by the monitoring unit (11), a connection request toward a failed SIP server (2_1) in which a failure has been detected by the monitoring unit (11) in cooperation with a DNS server (1).

20 Claims, 5 Drawing Sheets

(51) Int. Cl.
   *H04L 29/06*   (2006.01)
   *H04L 29/08*   (2006.01)

(56) References Cited

U.S. PATENT DOCUMENTS

2009/0040923 A1* 2/2009 Bantukul ................ H04L 41/06
                                                   370/230
2014/0248848 A1* 9/2014 Mufti .................. H04L 65/1046
                                                   455/404.1

OTHER PUBLICATIONS

[No Author Listed], "Common Interconnection Interface Between IMS Operator's Networks," The Telecommunication Technology Committee, Sep. 11, 2015, 20 pages.
Rosenberg et al., "Session Initiation Protocol (SIP): Locating SIP Servers," Network Working Group, Jun. 2002, 18 pages.
Rosenberg et al., "SIP: Session Initiation Protocol," Network Working Group, Jun. 2002, 270 pages.

* cited by examiner

| MANAGEMENT NUMBER | SRV RECORD | A RECORD |
|---|---|---|
| 2-1 | srv1.ip-a.ne.jp | IP ADDRESS a1 |
| 2-2 | srv2.ip-a.ne.jp | IP ADDRESS a2 |
| 2-3 | srv3.ip-a.ne.jp | IP ADDRESS a3 |

Fig. 4A

| MANAGEMENT NUMBER | SRV RECORD | A RECORD |
|---|---|---|
| 2-2 | srv2.ip-a.ne.jp | IP ADDRESS a2 |
| 2-3 | srv3.ip-a.ne.jp | IP ADDRESS a3 |

Fig. 4B

| MANAGEMENT NUMBER | SRV RECORD | A RECORD |
|---|---|---|
| 2-1 | srv1.ip-a.ne.jp | IP ADDRESS a1 |
| 2-2 | srv2.ip-a.ne.jp | IP ADDRESS a2 |
| 2-3 | srv3.ip-a.ne.jp | IP ADDRESS a3 |

Fig. 4C

FAILURE MONITORING DEVICE AND FAILURE MONITORING METHOD

CROSS-REFERENCE TO RELATED APPLICATIONS

This application is a National Stage application under 35 U.S.C. § 371 of International Application No. PCT/JP2019/016918, having an International Filing Date of Apr. 22, 2019, which claims priority to Japanese Application Serial No. 2018-082758, filed on Apr. 24, 2018. The disclosure of the prior application is considered part of the disclosure of this application, and is incorporated in its entirety into this application.

TECHNICAL FIELD

The present invention relates to a failure monitoring device and a failure monitoring method.

BACKGROUND ART

In recent years, IP telephone communication technologies using a session initiation protocol (SIP) have been widely used. In IP telephone communication using the SIP, an SIP server, which is a call control device, is disposed in an IP network, and SIP messages are transmitted and received between terminals through the SIP server, whereby call control such as establishment of a call and the like is performed.

CITATION LIST

Non Patent Literature

Non-Patent Literature 1: TTC, JJ-90.30 "Interconnection Common Interface between IMS Provider Networks"
Non-Patent Literature 2: 3 GPP, TS 29.165 "Inter-IMS Network to Network Interface (NNI)"
Non-Patent Literature 3: IETF, RFC3261 "SIP: Session Initiation Protocol"
Non-Patent Literature 4: IETF, RFC3263 "Session Initiation Protocol (SIP): Locating SIP Servers"

SUMMARY OF THE INVENTION

Technical Problem

Meanwhile, when an IP interconnection is made between IP telephone communication operators, in a case in which an IP telephone connection to one operator is made, a domain name system (DNS) server is assumed to be used. For example, a company's SIP server may extract an incoming call destination operator from an incoming call telephone number requested from a company user using an ENUM server (a system used for searching for a domain name used by an incoming call destination operator using an incoming call telephone number) or the like and inquire of a DNS server of an incoming call operator about an SIP server IP address used for accessing an incoming call operator SIP server based on the incoming call destination operator domain name. A communication operator arranges a plurality of SIP servers in preparation for a failure or the like, the DNS server responds to a connection source operator with a plurality of SIP server IP addresses set in advance, and the connection source operator is connected to one SIP server among them.

However, even in a case in which an SIP server of an incoming call destination cannot be used due to a failure or the like, the DNS server replies to a connection source operator with an incoming call destination IP address including the failed SIP server. For this reason, there is a problem in that a call connection cannot be made when the incoming call source operator is connected to the SIP server in which the failure has occurred.

The present invention is in view of the related art described above, and an object is to provide a failure monitoring device and a failure monitoring method reducing maintenance operations at the time of a failure of an SIP server.

Means for Solving the Problem

To achieve the object described above, an invention according to a first aspect is a failure monitoring device (10) essentially including a monitoring unit configured to transmit a monitoring signal from outside of an SIP server to the SIP server and detect a failure of the SIP server in accordance with presence/absence of a response from the SIP server or details of a response from the SIP server: and a control unit configured to inhibit, in a case in which a failure has been detected by the monitoring unit, a connection request to a failed SIP server in which a failure has been detected by the monitoring unit in cooperation with a DNS server.

According to an invention according to a second aspect, in the invention according to the first aspect, essentially, the control unit excludes an IP address of the failed SIP server from an SIP server information list of the DNS server that stores the IP address of the SIP server.

According to an invention according to a third aspect, in the invention according to the second aspect, essentially, the monitoring unit is configured to continuously transmit the monitoring signal after detection of a failure and detect restoration of the failed SIP server in accordance with presence/absence of a response from the failed SIP server or details of a response from the failed SIP server.

According to an invention according to a fourth aspect, in the invention according to the third aspect, essentially, the control unit is configured to re-register, in a case where restoration has been detected by the monitoring unit, the IP address that has been excluded from the SIP server information list of the DNS server.

According to an invention according to a fifth aspect, in the invention according to any one of the first to fourth aspects, essentially, the control unit is configured to notify the DNS server of a set of an SRV record and an A record.

According to an invention according to a sixth aspect, in the invention according to any one of the first to fourth aspects, essentially, the control unit is configured to notify the DNS server of a management number assigned to a set of an SRV record and an A record.

An invention according to a seventh aspect is a failure monitoring method essentially causing a computer to execute: transmitting a monitoring signal from the outside of an SIP server to the SIP server and detecting a failure of the SIP server in accordance with presence/absence of a response from the SIP server or details of a response from the SIP server; and inhibiting, in a case in which the failure has been detected in the detecting of a failure, a connection request toward a failed SIP server in which a failure has been detected in the detecting of a failure, in cooperation with the DNS server.

Effects of the Invention

According to the present invention, a failure monitoring device and a failure monitoring method reducing maintenance operations at the time of a failure of an SIP server can be provided.

BRIEF DESCRIPTION OF DRAWINGS

FIGS. 4A to 4C are explanatory diagrams of an SIP server information list of a DNS server according to the present embodiment.

DESCRIPTION OF EMBODIMENTS

Hereinafter, an embodiment of the present invention will be described with reference to the drawings. In description of the drawings to be presented below, the same or similar reference signs will be assigned to the same or similar parts.

Comparative Example and Problems Thereof

Figure 1:
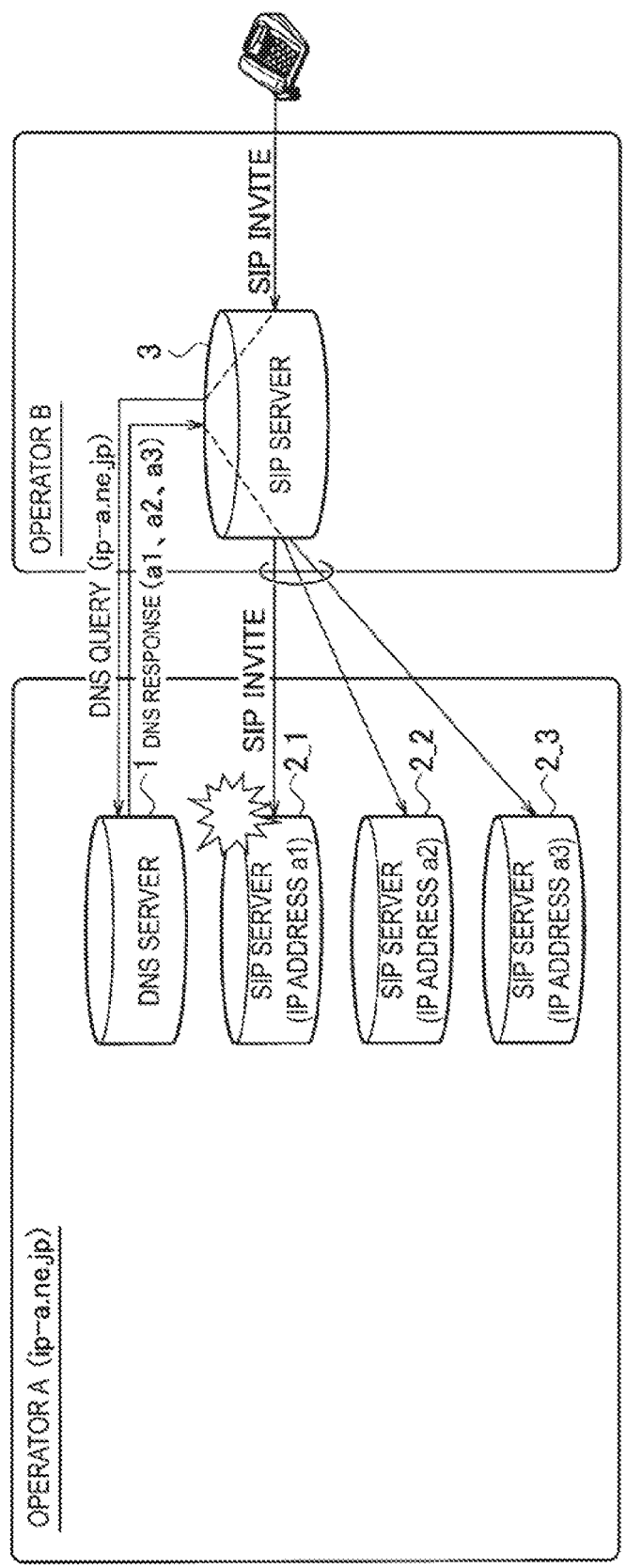
FIG. 1 is an explanatory diagram of a comparative example and problems thereof.

FIG. 1 is an explanatory diagram of a comparative example and problems thereof. Here, a situation in which a connection from an operator B to an operator A is made in an IP interconnection between the operators A and B using an SIP is illustrated. An IP address of an SIP server 2_1 of the operator A will be denoted by a1, an IP address of an SIP server 2_2 will be denoted by a2, and an IP address of an SIP server 2_3 will be denoted by a3. These SIP servers 2_1, 2_2, and 2_3 may also be described as "SIP server 2" without particular identification.

As illustrated in FIG. 1, for an IP interconnection between operators A and B using the SIP, an IP address of an SIP server 2 of an opponent operator is resolved from a domain name of a connection destination by using a DNS server 1. More specifically, an SIP server 3 of the operator B inquires of the DNS server 1 of the operator A with a domain name (ip-a.ne.jp) designated. Thus, the DNS server 1 replies with IP addresses a1, a2, and a3 as destination addresses of the domain name (ip-a.ne.jp).

However, the DNS server 1 returns the IP addresses a1, a2, and a3 registered in advance without taking the state of the SIP server 2 into account and thus returns the IP addresses a1, a2, and a3, for example, even in a case in which a failure has occurred in the SIP server 2_1. Thus, the SIP server 3 selects the SIP servers 2_1, 2_2, and 23 of connection destinations from the IP addresses a1, a2, and a3 received from the DNS response, and accordingly, a connection request dedicated for the SIP server 2_1 is continued, and a call loss occurs.

For this reason, according to the comparative example, when a failure occurs in the SIP server 2_1, there is a problem in that there are maintenance operations requiring inhibition of a call connection request toward the SIP server 2_1 through a contact to an opposite operator or the like. For example, it is considered to perform a countermeasure such as a quick contact to the operator B for a request for avoiding a connection to the SIP server 2_1 after a maintenance staff of the operator A detecting a failure, exclusion of the IP address a1 of the SIP server 2_1 from the DNS server 1 of its own operator, or the like.

DESCRIPTION OF EMBODIMENTS

Figure 2:
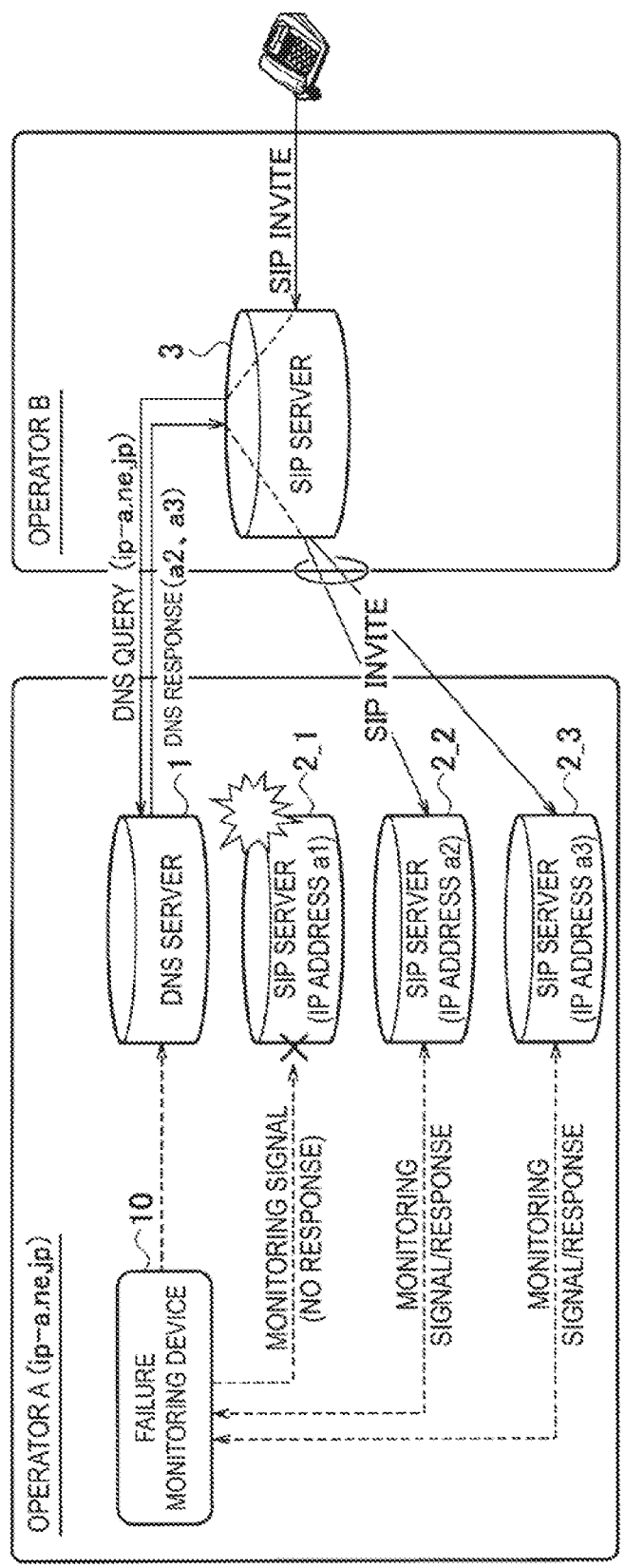
FIG. 2 is a configuration diagram of a communication system to which a failure monitoring device according to the present embodiment is applied.

FIG. 2 is a configuration diagram of a communication system to which a failure monitoring device 10 according to the present embodiment is applied. In order to solve the problems of the comparative example, this communication system realizes an automatic determination logic for an abnormality of the SIP server and automatic avoidance/automatic recovery of a call connection request from a connection source operator in cooperation with the DNS.

In other words, the failure monitoring device 10 regularly transmits a monitoring signal to the SIP servers 2_1, 2_2, and 2_3. As the monitoring signal, OPTIONS methods and the like of an SIP signal used in IP phone connection may be employed. Thus, in a case in which the SIP server 2_1 has N consecutive non-responses or an error response, a failure is determined to have occurred in the SIP server 2_1.

In a case in which a failure of the SIP server 2_1 has been detected in this way, the failure monitoring device 10 cooperates with the DNS server 1 such that the IP address a1 of the SIP server 2_1 is not to be returned. Thus, the IP address a1 is not set in the DNS response, and accordingly, a connection request for the SIP server 2_1 can be avoided without intervention of a maintenance staff.

The failure monitoring device 10 continues to transmit the monitoring signal to the SIP server 2_1 even after detection of a failure. Thus, in a case in which a normal response is received from the SIP server 2_1 or the like, it is determined that the SIP server 2_1 has been restored, and a notification can be given to the DNS server 1 to return the IP address a1 of the SIP server 2_1.

As described above, according to the present embodiment, at the time of an IP interconnection between operators via IP networks of IP telephone communication operators, when a failure has occurred in the SIP server 2 serving as a telephone exchange in an IP telephone network, a new telephone connection from the other operator to be connected to the SIP server 2 (the failed SIP server 2_1) in which a failure has been detected is automatically inhibited, a failure restoration of the failed SIP server 2-1 is automatically detected, and restart of a call connection from the other operator to the failed SIP server 2_1 is automatically realized. As a result, compared to the comparative example, maintenance operations at the time of a failure of the SIP server 2 can be reduced.

In addition, the failure monitoring device 10 may be provided inside the DNS server 1. Thus, the number of devices may be reduced to make it easy to manage the devices, and there is an advantage from a more maintenance point of view.

Failure Monitoring Device

Figure 3:
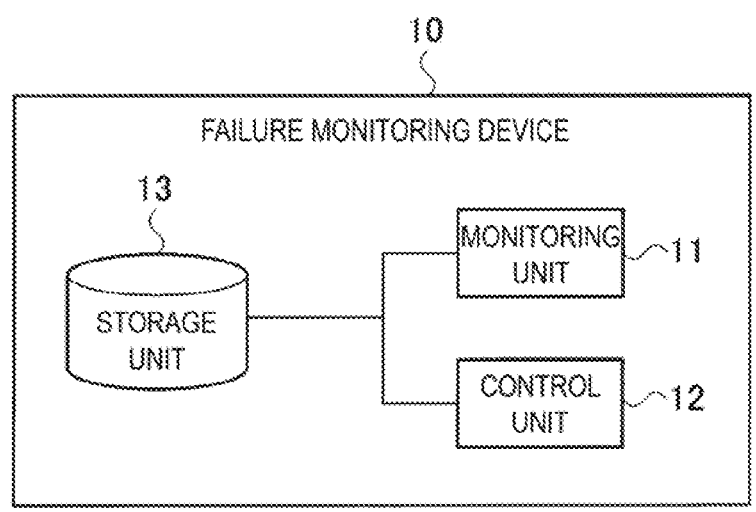
FIG. 3 is a functional block diagram of a failure monitoring device according to the present embodiment.

FIG. 3 is a functional block diagram of a failure monitoring device 10 according to the present embodiment. The failure monitoring device 10 is a computer that monitors a failure of the SIP server 2 in cooperation with the DNS server 1 and, as illustrated in FIG. 3, includes a monitoring unit 11, a control unit 12, and a storage unit 13.

The monitoring unit 11 is a functional unit that monitors a failure of the SIP server 2. More specifically, the monitoring unit 11 has a function of automatically detecting an abnormality of the SIP server of its own operator from outside the SIP server 2. In addition, the monitoring unit 11 has a function of automatically detecting restoration of the SIP server 2 from the outside of the SIP server 2.

The control unit 12 is a functional unit that performs various controls based on monitoring results acquired by the monitoring unit 11. More specifically, the control unit 12 has a function of automatically inhibiting connection from a connection source operator to the failed SIP server 2_1. In addition, the control unit 12 has a function of re-registering (restoring) information of the failed SIP server 2_1.

The storage unit 13 is a storage device that stores various kinds of information. For example, the storage unit 13 stores setting values set by a maintenance staff and the like in advance. In addition, the storage unit 13 may store an SIP server information list that is similar to that of the DNS server 1 (to be described below).

In a case in which a series of processes according to the failure monitoring device 10 is executed by software, a program configuring the software is installed in a computer. In the computer, a central processing unit (CPU), a read only memory (ROM), and a random access memory (RAM) are interconnected through a bus. In addition, an input/output interface is connected to the bus. Input units such as a keyboard and a mouse, output units such as a display and a speaker, and the like are connected to the input/output interface.

SIP Server Information List

FIGS. 4A to 4C are explanatory diagrams of an SIP server information list of the DNS server 1 according to the present embodiment, FIG. 4A illustrates a state before detection of a failure, FIG. 4B illustrates a state before restoration of a failure after detection of the failure, and FIG. 4C illustrates a state after detection of restoration of a failure. Here, a case in which a failure has occurred in the SIP server 2_1 is assumed.

As illustrated in FIGS. 4A to 4C, the SIP server information list includes a SeRVice locator (SRV) record that designates a server providing network services and a host Address (A) record representing correspondence from a domain name or a host name to an IP address. In addition, a management number assigned to a set of the SRV record and the A record may be included. It is apparent that other information may be included in the SIP server information list.

Failure Monitoring Method

Figure 5:
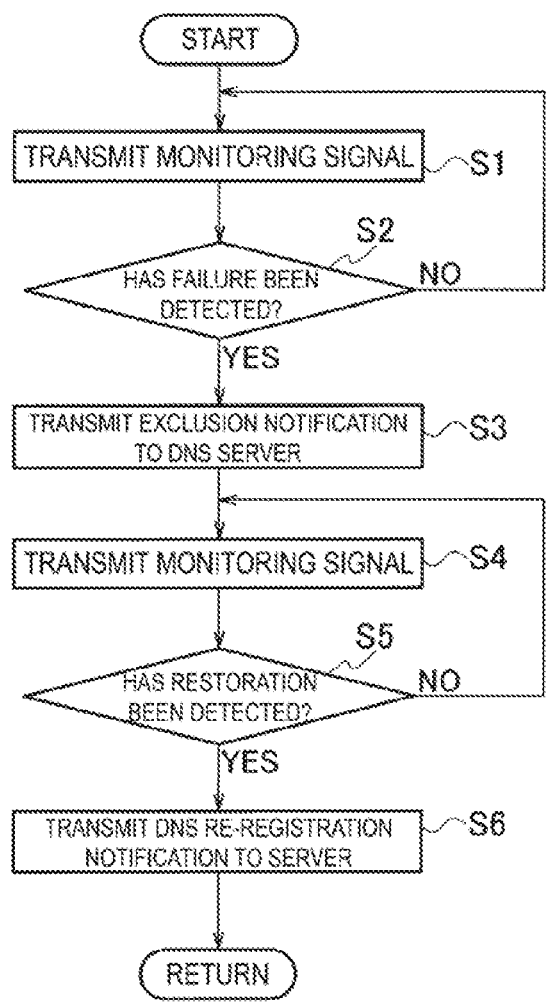
FIG. 5 is a flowchart illustrating operations of the failure monitoring device according to the present embodiment.

FIG. 5 is a flowchart illustrating operations of the failure monitoring device 10 according to the embodiment of the present invention. Hereinafter, the configuration of the failure monitoring device 10 will be described together with the operations with reference to FIG. 5.

First, the monitoring unit 11 regularly transmits a monitoring signal such as OPTIONS methods of an SIP signal to the SIP server 2 that is a monitoring target. As a result, in a case in which the number of times of detection of an abnormality per unit time (e.g. non-response or an error response of ten times per hour) or the number of times of consecutive detection of an abnormality (e.g. five consecutive non-responses or error responses) set by a maintenance staff or the like in advance is satisfied, it is determined that a failure has occurred in the SIP server 2 (Step S1->S2: Yes).

Next, in a case in which a failure of the SIP server 2_1 is detected by the monitoring unit 11, in order to inhibit connection to the failed SIP server 2_1 from an opposite operator network, the control unit 12 transmits an exclusion notification to the DNS server 1 so that the IP address a1 of the failed SIP server 2_1 is excluded from the SIP server information list (Step S3). Thus, when the DNS server 1 excludes the IP address a1 from the SIP server information list, connection from a connection source operator to the failed SIP server 2_1 can be inhibited.

After detection of a failure, there is a possibility that connection performance to a connection source operator is decreases. Thus, in order to quickly restore the connection performance after restoration of the failed SIP server 2_1, the monitoring unit 11 continues to transmit a monitoring signal to the failed SIP server 21 using the same process as that of Step S1 (Step S4). As a result, in a case in which reception of a normal response (e.g. 200 OK signals of the SIP signal) satisfies the number of times of reception of a normal response per unit time (e.g. five times per minute) or the number of times of consecutive reception of a normal response signal (e.g. five consecutive normal responses) set by a maintenance staff or the like in advance, it is determined that the failed SIP server 2_1 has been restored (Yes in Step S5).

Finally, in a case in which restoration of the failed SIP server 2_1 is detected by the monitoring unit 11, the control unit 12 transmits a re-registration notification to the DNS server 1 so that the information that has been excluded in Step S3 is automatically re-registered in the SIP server information list (Step S6). Thus, when the DNS server 1 re-registers the IP address a1 in the SIP server information list, connection from an incoming call source operator to the restored SIP server 2_1 can be made again.

Notification Method

As a notification method from the failure monitoring device 10 to the DNS server 1, one of a first notification method or a second notification method to be described below may be employed.

First, the first notification method will be described. The first notification method is a method in which a set of the SRV record and the A record is notified from the failure monitoring device 10 to the DNS server 1.

For example, the failure monitoring device 10 transmits an exclusion notification to the DNS server 1 with a set of the SRV record and the A record designated. In such a case, the DNS server 1 removes the set of the SRV record and the A record designated in the exclusion notification from the SIP server information list.

In addition, the failure monitoring device 10 transmits a re-registration notification to the DNS server 1 with a set of the SRV record and the A record designated. In this case, the DNS server 1 adds the set of the SRV record and the A record designated in the re-registration notification to the SIP server information list.

Next, the second notification method will be described. The second notification method is a method in which a management number is notified from the failure monitoring device 10 to the DNS server 1. A SIP server information list similar to that of the DNS server 1 is assumed to be stored in the storage unit 13 of the failure monitoring device 10.

For example, the failure monitoring device 10 transmits an exclusion notification to the DNS server 1 with a management number designated. In this case, the DNS server 1 disables the set of the SRV record and the A record of the management number designated in the exclusion notification in the SIP server information list.

In addition, the failure monitoring device 10 transmits a re-registration notification to the DNS server 1 with the management number designated. In this case, the DNS server 1 enables the set of the SRV record and the A record of the management number designated in the re-registration notification in the SIP server information list.

Summary

As described above, the failure monitoring device 10 according to the present embodiment includes: the monitoring unit 11 configured to transmit a monitoring signal from the outside of an SIP server 2 to the SIP server 2 and detect a failure of the SIP server 2 in accordance with presence/absence of a response from the SIP server 2 or details of a response from the SIP server 2; and the control unit 12 configured to inhibit, in a case in which the failure has been detected by the monitoring unit 11, a connection request toward a failed SIP server 2_1 in which a failure has been detected by the monitoring unit 11 in cooperation with a DNS server 1. Thus, the failure monitoring device 10 that reduces maintenance operations at the time of occurrence of a failure in the SIP server 2 can be provided.

More specifically, the control unit 12 may exclude the IP address a1 of the failed SIP server 2_1 from the SIP server information list of the DNS server 1 that stores the IP address of the SIP server 2. Thus, because the IP address a1 is not set in the DNS response, a connection request toward the failed SIP server 2_1 can be avoided without intervention of a maintenance staff.

In addition, the monitoring unit 11 may continue to transmit the monitoring signal even after the detection of a failure and detect restoration of the failed SIP server 2_1 in accordance with presence/absence of a response from the failed SIP server 2_1 or details of a response from the failed SIP server 2_1. Thus, after restoration of the failed SIP server 2_, the connection performance can be quickly recovered.

In addition, in a case in which restoration is detected by the monitoring unit 11, the control unit 12 may re-register the IP address a1 that has been excluded from the SIP server information list of the DNS server 1. Thus, because the IP address a1 is set again in the DNS response, connection request toward the failed SIP server 2_1 can be reactivated without intervention of a maintenance staff.

In addition, the control unit 12 may notify the DNS server 1 of the set of the SRV record and the A record. Generally, the DNS server 1 stores a set of the SRV record and the A record, and thus, cooperation with the DNS server 1 can be easily performed.

In addition, the control unit 12 may notify the DNS server 1 of the management number assigned to the set of the SRV record and the A record. Thus, cooperation with the DNS server 1 can be efficiently performed using the management number.

In addition, the failure monitoring method according to the present embodiment causes a computer to execute: transmitting a monitoring signal from the outside of an SIP server 2 to the SIP server 2 and detecting a failure of the SIP server 2 in accordance with presence/absence of a response from the SIP server 2 or details of a response from the SIP server 2, and inhibiting, in a case in which the failure has been detected in the detecting of a failure, connection request toward a failed SIP server 2_1 in which a failure has been detected in the detecting of a failure, in cooperation with the DNS server 1. Thus, a failure monitoring method for reducing maintenance operations at the time of occurrence of a failure in the SIP server 2 can be provided.

REFERENCE SIGNS LIST

1 DNS Server
2 SIP Server
2_1 Failed SIP server
10 Failure monitoring device
11 Monitoring unit
12 Control unit
13 Storage unit

The invention claimed is:

1. A failure monitoring device comprising:
a monitoring unit, including one or more processors, configured to:
transmit a monitoring signal from outside of a session initiation protocol (SIP) server to the SIP server;
detect a failure of the SIP server in accordance with an absence of a response from the SIP server or detect a failure of the SIP server based on details of a response from the SIP server indicating the failure of the SIP server; and
a control unit, including one or more processors, configured to:
in response to the monitoring unit detecting the failed SIP server, instruct a domain name system (DNS) server to exclude an internet protocol (IP) address associated with the failed SIP server from being provided in response to future connection requests until the monitoring unit detects that the failed SIP server is restored.

2. The failure monitoring device according to claim 1, wherein the control unit is configured to instruct the DNS server to exclude the IP address of the failed SIP server from an SIP server information list in the DNS server that stores IP addresses of SIP servers.

3. The failure monitoring device according to claim 2, wherein the monitoring unit is configured to continuously transmit the monitoring signal after detection of the failed SIP server and detect restoration of the failed SIP server in accordance with presence/absence of a response from the failed SIP server or details of a response from the failed SIP server.

4. The failure monitoring device according to claim 3, wherein the control unit is configured to re-register, in a case where restoration has been detected by the monitoring unit, the IP address that has been excluded from the SIP server information list in the DNS server.

5. The failure monitoring device of claim 4, wherein the control unit is configured to, in response to the monitoring unit detecting that the failed SIP server has been restored, transmit a re-registration notification to the DNS server that indicates the IP address associated with the failed SIP server that has been excluded from the SIP server information list is to be automatically re-registered in the SIP server information list in the DNS server and available for future connection requests from call operators.

6. The failure monitoring device according to claim 1, wherein the control unit is configured to transmit a notification to the DNS server, the notification including a set of SeRVice locator (SRV) record and an A record.

7. The failure monitoring device according to claim 1, wherein the control unit is configured to transmit a notification to the DNS server, the notification including a management number assigned to a set of an SRV record and an A record.

8. The failure monitoring device of claim 1, wherein the failure monitoring device is located external to the DNS server.

9. A failure monitoring method causing a computer to execute:
transmitting a monitoring signal from the outside of a session initiation protocol (SIP) server to the SIP server;

detecting a failure of the SIP server in accordance with an absence of a response from the SIP server or detect a failure of the SIP server based on details of a response from the SIP server indicating the failure of the SIP server; and in response to detecting the failed SIP server, instructing a domain name system (DNS) server to exclude an internet protocol (IP) address associated with the failed SIP server from being provided in response to future connection requests until the failed SIP server is restored.

10. The failure monitoring method of claim 9, further comprising:

instructing the DNS server to exclude the IP address of the failed SIP server from an SIP server information list in the DNS server that stores IP addresses of SIP servers.

11. The failure monitoring method of claim 10, further comprising:

transmitting, continuously, the monitoring signal after detection of the failed SIP server; and detecting restoration of the failed SIP server in accordance with presence/absence of a response from the failed SIP server or details of a response from the failed SIP server.

12. The failure monitoring method of claim 11, further comprising:

re-registering, in a case where restoration has been detected, the IP address that has been excluded from the SIP server information list in the DNS server.

13. The failure monitoring method of claim 12, further comprising:

in response to detecting that the failed SIP server has been restored, transmitting a re-registration notification to the DNS server that indicates that the IP address associated with the failed SIP server that has been excluded from the SIP server information list is to be automatically re-registered in the SIP server information list in the DNS server and available for future connection requests from call operators.

14. The failure monitoring method of claim 9, further comprising:

transmitting a notification to the DNS server, the notification including a set of SeRVice locator (SRV) record and an A record.

15. The failure monitoring method of claim 9, further comprising:

transmitting a notification to the DNS server, the notification including a management number assigned to a set of an SRV record and an A record.

16. The failure monitoring method of claim 9, wherein the computer is located external to the DNS server.

17. One or more non-transitory computer-readable media comprising instructions stored thereon that are executable by one or more processing devices and upon such execution cause the one or more processing devices to perform operations comprising:

transmitting a monitoring signal from the outside of a session initiation protocol (SIP) server to the SIP server;

detecting a failure of the SIP server in accordance with an absence of a response from the SIP server or detect a failure of the SIP server based on details of a response from the SIP server indicating the failure of the SIP server; and in response to detecting the failed SIP server, instructing a domain name system (DNS) server to exclude an internet protocol (IP) address associated with the failed SIP server from being provided in response to future connection requests until the failed SIP server is restored.

18. The one or more non-transitory computer-readable media of claim 17, further comprising:

instructing the DNS server to exclude the IP address of the failed SIP server from an SIP server information list in the DNS server that stores the IP addresses of SIP servers.

19. The one or more non-transitory computer-readable media of claim 18, further comprising:

transmitting, continuously, the monitoring signal after detection of the failed SIP server; and detecting restoration of the failed SIP server in accordance with presence/absence of a response from the failed SIP server or details of a response from the failed SIP server.

20. The one or more non-transitory computer-readable media of claim 19, further comprising:

re-registering, in a case where restoration has been detected, the IP address that has been excluded from the SIP server information list in the DNS server.

* * * * *